March 25, 1924.
J. M. McG. BARR
1,487,702
DEVICE FOR OBTAINING OSCILLATING MOTION
Filed July 9, 1923
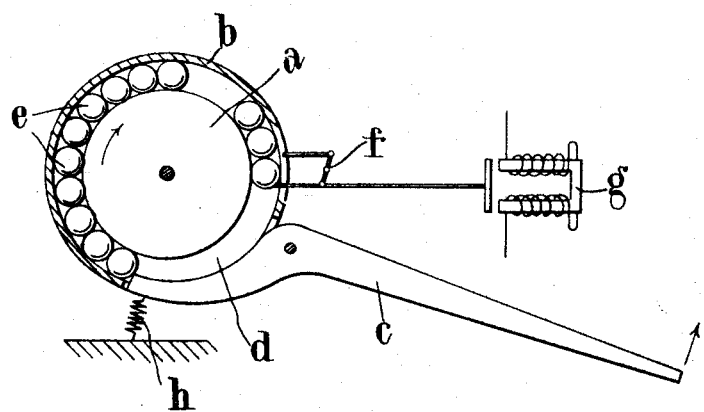
Inventor
J. M. McG. Barr
By Marks & Clerk Attys Patented Mar. 25, 1924.

1,487,702

UNITED STATES PATENT OFFICE.

JAMES MARK McGINNIS BARR, OF LONDON, ENGLAND.

DEVICE FOR OBTAINING OSCILLATING MOTION.

Application filed July 9, 1923. Serial No. 650,502.

*To all whom it may concern:*

Be it known that I, JAMES MARK MC-GINNIS BARR, a citizen of the United States of America, and residing at 68 Victoria Street, London, S. W. 1, England, have invented certain new and useful Improvements in Devices for Obtaining Oscillating Motion (for which I have filed an application in Great Britain on March 1, 1922, No. 6,069), of which the following is a specification.

This invention relates to mechanical devices in which a comparatively small force acting upon a release or trigger member may be made to cause a comparatively heavier lever, slide, wheel or other member to be oscillated in such manner as to exert a force very much greater than the force actuating the trigger or release member.

The object of the invention is to provide a simple cheap and efficient device of the above character which, while particularly suitable for use in connection with certain operations involved in calculating machines, such as the operation of switches in electrically operated calculating machines, may be capable of general application to any situation in which such devices may be employed.

The invention consists in a mechanical device of the kind referred to in which the member to be oscillated is moved by frictionally operated means exerting a wedging action on said member.

The invention also consists in a mechanical device of the kind referred to in which the oscillating member is operated by a ball forced through a tapering or gradually diminishing space one part of which is formed by the movable relay lever or other member.

The invention also consists in other details and arrangements hereinafter described or indicated.

The accompanying drawing illustrates more or less diagrammatically one convenient form of relay in accordance with the invention.

In carrying my invention into effect in the manner illustrated, I form my improved device with a shaft or disc $a$ adapted to be rotated within a casing $b$ and which cooperates with the arcuate end of a relay lever $c$ to form a tapering wedge-shaped or gradually diminishing space $d$.

The annular passage between the disc $a$ and the casing $b$ is partially filled with balls $e$, these being temporarily held in place by a trigger or release member $f$ adapted to be actuated by the electromagnet $g$, or by any suitable mechanical, electric, pneumatic, or other means so that upon the operation of the member $f$ one ball is released while the remainder are held. The ball which is released drops by gravity or may be propelled by a spring or may otherwise be caused to move into the opening of the wedge-shaped space $d$ and the arrangement is such that the rotating member forces the ball through such wedge space thus pressing out the end of the lever $c$ against the action of the retaining spring $h$ and causing the outer end of the lever $c$ to move in the direction of the arrow with a force which is very much greater than that which must be applied to the member $f$ and which in effect is limited only by the breaking strain of the parts involved in the relay construction. The ball is thus passed through the space and displaces the remainder of the balls after it has passed the end of the lever $c$ so that the latter again comes under the influence of the spring $h$ and in this way the operation of the relay may be continued indefinitely since the supply of balls is always automatically replenished.

It will be understood that the lever or trigger device used to release the ball and cause it to be inserted into the wedge space may be of any convenient form and be of a comparatively light or delicate nature, while the pivoted shoe or lever $c$ or other member may be of a stronger or heavier construction so that it may exert during its cycle of motion a force which is very great compared with the force necessary to release a ball.

For the purpose of guiding the balls the shoe end of the lever $c$ and the rotating member $a$ may be formed with V-shaped grooves so that in this way the balls will be properly guided laterally.

A device such as above described will operate at any desired instant and is not dependent upon the speed of revolution of the disc or member $a$.

It is to be understood that the invention is not to be limited to the particular details of construction hereinbefore given by way of illustration as I may modify the form and construction of the members constituting the wedge space, the mode of arrangement and the form and construction of the relay member which is to exert the increased force and the disposition of the various parts in relation to one another, depending upon any particular practical requirements that may have to be fulfilled.

Furthermore, I may, if desired, employ the face of the revolving disc instead of its periphery to form one part of the wedge space, in which case the shoe or other member is suitably formed to co-operate therewith.

Claims—

1. A mechanical device comprising a rotatable member, a casing surrounding said member, a ball arranged between said casing and said member, a movable member projecting partially into said casing, spring means normally retaining the movable member in inwardly projected position with relation to said casing, said movable member and said rotatable member forming a wedge-shaped space, and means for permitting said ball to pass into said space.

2. A mechanical device of the character described comprising a rotatable member, a casing surrounding said member, a plurality of balls arranged between said casing and said member, a movable member partially projecting into said casing, means normally retaining the movable member in inwardly projected position relative to said casing, said movable member and said rotatable member providing a substantially wedge-shaped space adapted to receive said balls, and means for releasing and permitting one ball at a time to enter said space.

In testimony whereof I have signed my name to this specification.

JAMES MARK McGINNIS BARR.